United States Patent [19]
Suzuki

[11] Patent Number: 5,320,466
[45] Date of Patent: Jun. 14, 1994

[54] LOCKING NUT AND A FASTENING STRUCTURE MADE UP OF THE LOCKING NUT AND A MEMBER BEING TIGHTENED

[75] Inventor: Yasuo Suzuki, Asaka, Japan

[73] Assignee: Kabushiki Kaisha Suzuki Rashi Seisakusho, Saitama, Japan

[21] Appl. No.: 47,533

[22] Filed: Apr. 19, 1993

Related U.S. Application Data

[62] Division of Ser. No. 945,785, Sep. 15, 1992, abandoned.

[30] Foreign Application Priority Data

Sep. 20, 1991 [JP] Japan .................. 3-241182
Aug. 11, 1992 [JP] Japan .................. 4-213912

[51] Int. Cl.⁵ .................................................. F16B 39/36
[52] U.S. Cl. .................................... 411/266; 411/280
[58] Field of Search ............... 411/265, 266, 267, 280, 411/335, 276, 277, 278, 280, 155, 156

[56] References Cited

U.S. PATENT DOCUMENTS

| | | | |
|---|---|---|---|
| 1,320,259 | 10/1919 | Martens | 411/155 X |
| 1,927,705 | 9/1933 | D'Halloy | 411/278 |

FOREIGN PATENT DOCUMENTS

| | | | |
|---|---|---|---|
| 499122 | 3/1951 | Belgium | 411/266 |
| 686295 | 7/1930 | France | 411/155 |
| 765730 | 3/1934 | France | 411/266 |
| 1014500 | 8/1952 | France | 411/266 |
| 1125104 | 10/1956 | France | 411/266 |
| 575447 | 4/1958 | Italy | 411/265 |
| 643981 | 8/1962 | Italy | 411/266 |
| 179829 | 12/1935 | Switzerland | 411/266 |

Primary Examiner—Rodney M. Lindsey
Attorney, Agent, or Firm—Lowe, Price, LeBlanc & Becker

[57] ABSTRACT

The invention is intended to provide a fastening structure made up of a nut and a to-be-tightened member which does not get loose even when used in places where it is subject to large vibrations. The nut has a cylindrical female screw extension portion which projects from the seat of the nut and which has a female screw formed in the inner circumferential surface thereof. The to-be-tightened member which is on the male screw side is formed with a fastening hole into which the female screw extension portion is to be fitted. The inner surface of the fastening hole and the outer surface of the female screw extension portion are tapered so that there is a taper angle difference. As the nut is fastened onto the male screw, the female screw extension portion is pushed inwardly and deformed due to the taper angle difference so that the female screw formed on the female screw extension portion is pressed against the male screw. When, with the nut fastened in this way, the fastening force applied to the nut is removed, the female screw remains deformed and pressed against the male screw, preventing the nut from becoming loose.

5 Claims, 5 Drawing Sheets

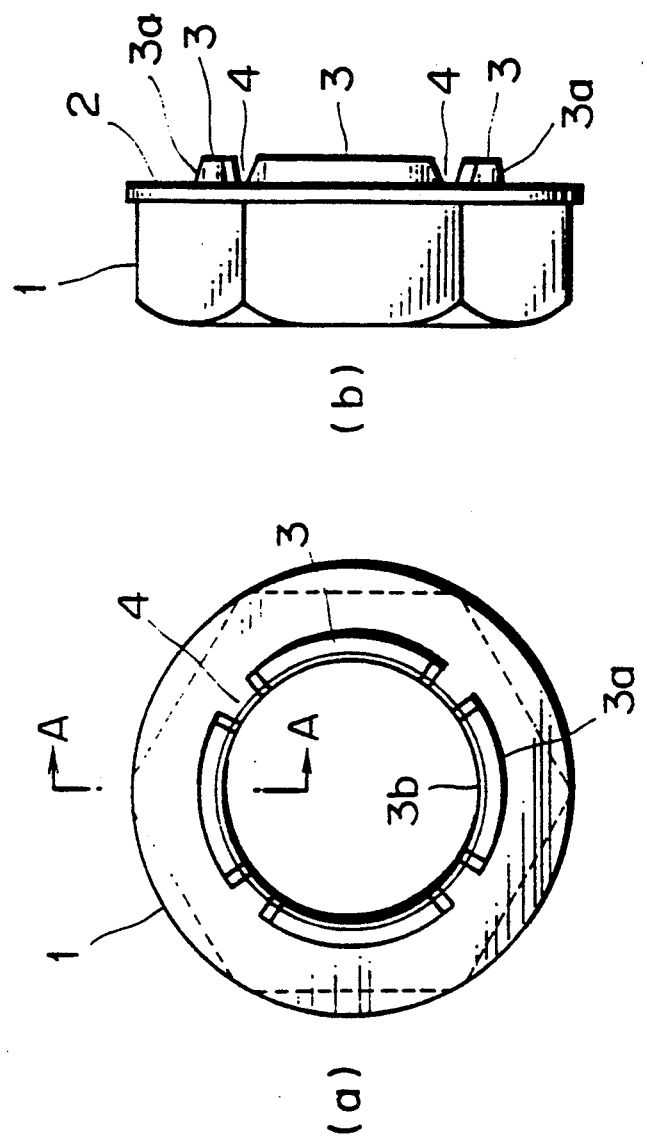

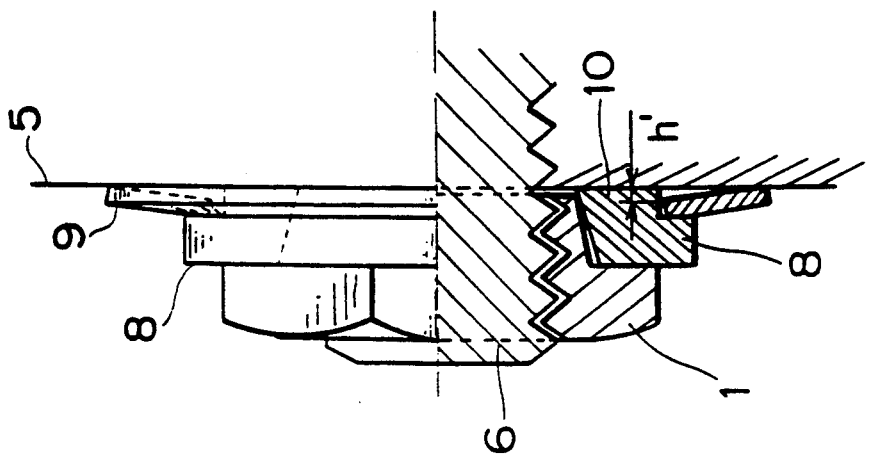
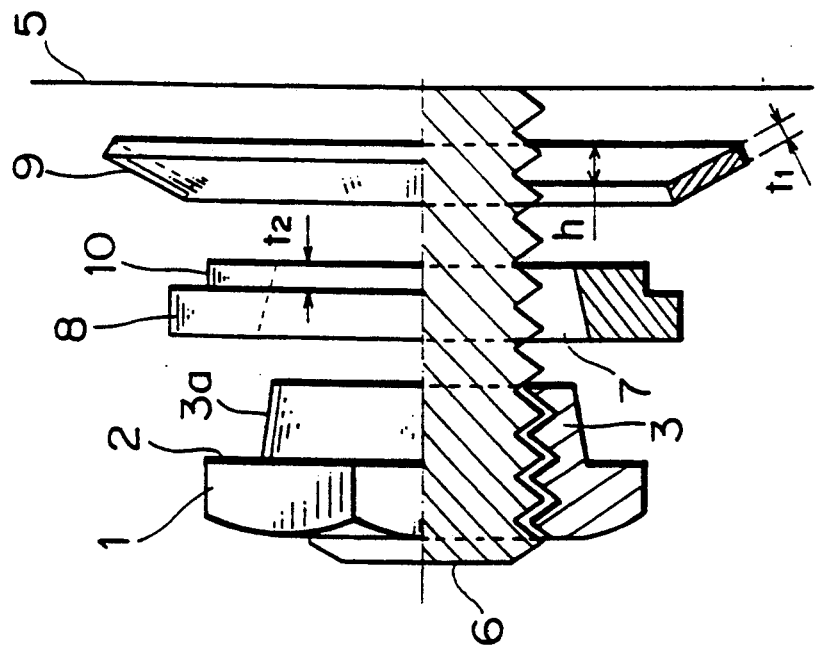

LOCKING NUT AND A FASTENING STRUCTURE MADE UP OF THE LOCKING NUT AND A MEMBER BEING TIGHTENED

This application is a division of application Ser. No. 07/945,785 filed Sep. 15, 1992 now abandoned.

BACKGROUND OF THE INVENTION

1. Field of the Invention

The present invention relates to a nut and more particularly to a locking nut and a fastening structure consisting of the locking nut and a member being tightened.

2. Description of the Prior Art

Tightening and securing of a member by fastening a nut onto a male screw provided to the member is widely applied in assembling a variety of machine parts. It is noted, however, that between the male and the female screws fitted together a gap easily forms, so that the nut can be reversed and loosened with a light force.

Many proposals have been made to prevemt the loosening of the nut. They include, for example, a method which inserts a spring washer between the nut and the member being tightened, a method which tightens the nut and then deforms it by applying an external force to the nut, and a method that inserts a cotter pin into a hole cut through both the male screw and the nut.

Where the nut is subject to incessant large vibrations, like the ones used for fixing gears in automotive gear box, the spring washer is not sufficient in preventing the nut from becoming loose. The nut deforming method results in large variations in deformations and thus lacks quality stability. With the method of cutting a through-hole in the nut and the male screw, it is necessary to align the hole in the nut with the hole in the male screw, which may in turn make the tightening force become insufficient. Further, the formation of the through-hole reduces the strength of the male screw.

SUMMARY OF THE INVENTION

This invention has been accomplished in light of the above-mentioned facts and is intended to provide a fastening structure consisting of a nut and a member being tightened in which the nut does not become loose even when the fastening structure is used in places where it is subject to large vibrations.

To achieve the above objective, the fastening structure consisting of a nut and a member being tightened according to this invention comprises: a nut and a to-be-tightened member; a cylindrical female screw extension portion which projects from the seat of the nut and which has a female screw formed in the inner circumferential surface thereof; and a fastening hole formed in the member on the male screw side into which the female screw extension portion is to be fitted; whereby the inner surface of the fastening hole and the outer surface of the female screw extension portion are tapered so that there is a taper angle difference between the two surfaces and that when the nut is fastened onto the male screw, the female screw extension portion is deformed inwardly due to the taper angle difference and pressed against the male screw, preventing the loosening of the nut.

The above construction may include a dish spring which is deformed by fastening the nut and a spacer which is loosely fitted into the hole in the dish spring and thicker than the thickness of the dish spring.

As the nut is fastened onto the male screw, the female screw extension portion reaches the to-be-tightened member and begins to advance into the fastening hole therein. Because there is an angle difference between the outer surface of the female screw extension portion and the inner surface of the fastening hole, as the female screw extension portion is driven into the fastening hole by turning the nut, the female screw extension portion is deformed inwardly due to the taper angle difference between the contacting surfaces causing the female screw of the extension portion to be pressed against the male screw. When, after the nut is fastened in this way, the fastening force applied to the nut is removed, the female screw remains deformed and pressed against the male screw, preventing the nut from becoming loose.

When a dish spring and a spacer are used, fastening the nut deflects the dish spring until the front end surface of the spacer engages with the to-be-tightened member, at which time the fastening process is completed. Since the spacer thickness is larger than the thickness of the dish spring, the dish spring is not flattened but has a slight residual depth when the fastening process is completed. This means that the dish spring can exert a strong spring force to prevent the loosening of the nut.

BRIEF DESCRIPTION OF THE DRAWINGS

FIGS. 1a and 1b show a lock nut with FIG. 1a representing a front view and FIG. 1b a side view;

FIGS. 4a and 4b show an embodiment which has a dish spring and a spacer installed between the nut and the washer, with FIG. 4a representing a half cross-sectional view of the structure before being tightened and FIG. 4b representing a half cross-sectional view of the structure completely tightened.

DETAILED DESCRIPTION OF PREFERRED EMBODIMENTS

Figure 2A:
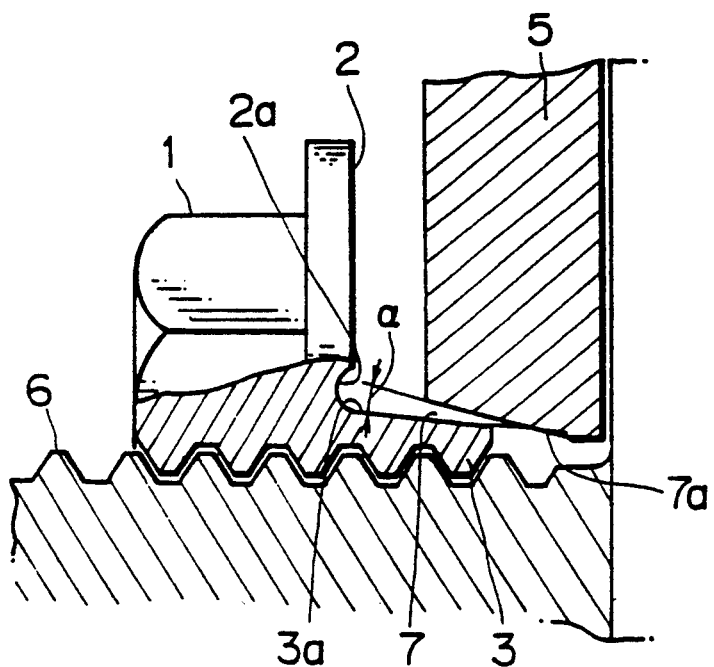
FIGS. 2a and 2b are cross sections taken along the line A—A of FIG. 1, with FIG. 2a showing the state where the structure begins to be tightened and FIG. 2b showing the state where the structure is completely tightened.

Embodiments of this invention will be described by referring to the attached drawings.

FIGS. 1a and 1b show the nut of this invention. As shown in the figures, the nut 1 has a cylindrical female screw extension portion 3 that projects parallel to the screw axis from the seat 2. The extension portion 3 has its outer surface 3a tapered so that its end is slightly narrower. The extension portion 3 has its inner surface 3b formed with an extension of the female screw of the nut. The extension portion 3 also is divided into an appropriate number of parts by a plurality of dividing grooves 4 radially cutting therethrough.

Figure 2B:
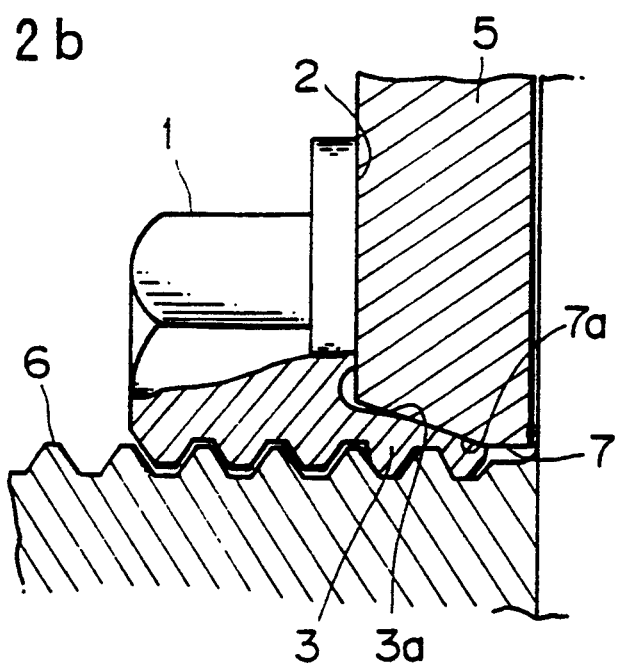

FIGS. 2a and 2b show the fastening structure that consists of the nut 1 and a to-be-tightened member 5. The to-be-tightened member 5 and the male screw 6 are integrally connected, and the member 5 is cut with a fastening hole 7 which is open wide at the inlet and whose inner surface 7a is tapered so that the hole becomes progressively narrower toward the inmost depth. There is a small difference $\alpha$ in angle between the taper of the inner surface 7a and the taper of the outer surface 3a of the extension portion 3. An annular recess 2a is formed where the seat 2 comes into contact with the extension portion 3 in order to ensure a surface contact between the seat 2 and the member 5 being tightened.

As the nut 1 is engaged with and begins to be fastened onto the male screw 6, the front end of the extension portion 3 advances into the fastening hole 7, as shown in FIG. 2a. Because there is an angle difference $\alpha$ a between the outer surface 3a of the extension portion 3 and the inner surface 7a of the fastening hole 7, when the nut 1 is further fastened from the state of FIG. 2a, the front end of the extension portion 3 is pressed against the inner surface 7a of the fastening hole 7 and deformed inwardly, causing the female screw to be pressed against the male screw, as shown in FIG. 2b. In this state, if the fastening force applied to the nut is removed, the deformed state of the extension portion 3 is maintained and the female screw is kept pressed against the male screw, providing an enough friction force to resist the loosening torque of the nut.

The dividing grooves 4 make it easy for the extension portion 3 to deform as mentioned above. However, if the nut is made by using an appropriate material, the deformation of the extension portion 3 is possible even if no dividing grooves 4 are provided. Further, the number of the dividing grooves 4 is not limited to a particular one.

Between the outer surface 3a of the extension portion 3 and the inner surface 7a of the fastening hole 7 there need only be a slight angle difference. The object of the invention can be accomplished if one of the tapers is not provided. However, the provision of the taper to both surfaces will increase the contact area between the two surfaces thereby increasing the capability to prevent the loosening of the nut.

Figure 3:
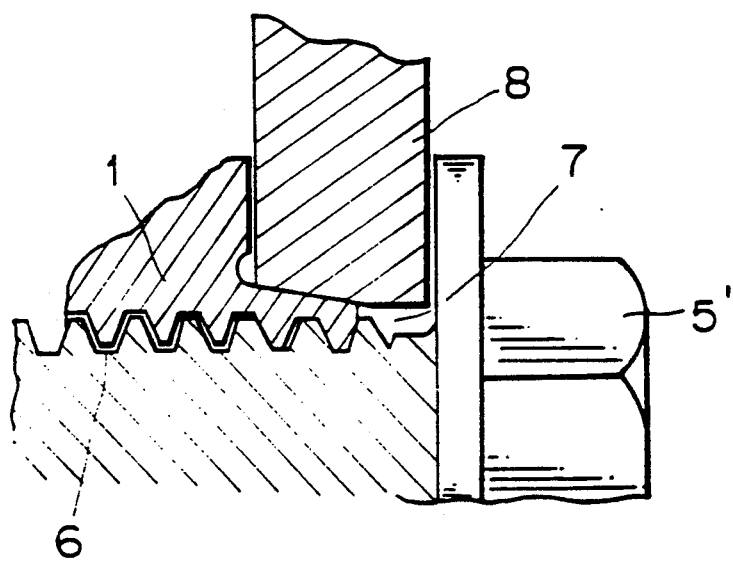
FIG. 3 shows another embodiment of the invention.

FIG. 3 shows another embodiment of the invention. This embodiment is effective where the to-be-tightened member 5 is not formed with a fastening hole. A washer 8 is inserted between the nut 1 and the member 5 being tightened. The washer 8 is formed with a tapered fastening hole 7. Although the washer 8 and the member 5 are separate from each other, since the extension portion 3 is deformed to press against the male screw 6, producing a sufficient friction to resist the loosening of the nut, the nut is reliably locked.

The use of a common spring washer, not shown, increases the resistance against the loosening of the nut. When the spring washer is too thick, a waved washer may be used instead to produce a similar effect.

If a dish spring is used instead of the spring washer and waved washer, a large spring force is obtained. There is, however, a problem with the dish spring. The relationship between deflection and load of the dish spring is a function of the third degree, so that when the dish spring is deflected too much until it is flat, the load decreases lowering the locking capability of the dish spring.

FIGS. 4a and 4b shows a further embodiment that solves this problem. In this embodiment, a dish spring 9 which is h deep when not loaded is inserted between the washer 8 and the member 5 being tightened. The washer 8 has a spacer 10 formed integral therewith and projecting from the bottom thereof. The thickness t2 of the spacer 10 is larger than the thickness t1 of the dish spring 9.

In the above construction, as the nut 1 is tightened, the spacer 10 is pressed against the tightened member 5 as shown in FIG. 4b, which indicates the fastening structure in a completely tightened state. As mentioned earlier, there is a relationship of t2>t1, so that the dish spring 9 cannot be deformed until it is completely flattened and there is always a residual depth h'=t2−t1.

Since the deflection $\delta$ of the dish spring can be expressed as the difference between the depth h at no load and the depth h' when loaded, the dish spring is flattened completely when $\delta=h$, at which time the load decreases lowering the locking capability. It is known that the load is maximum when $\delta=0.7-0.8h$. Therefore, in this invention, the thickness t2 of the spacer 10 is adjusted so that the residual depth h' will be h'=0.2−0.3h and that the dish spring 9 exerts a maximum spring force when the nut 1 is tightened.

While in this embodiment the spacer 10 is formed integral with the washer 8, they can be formed separate.

Figure 5A:
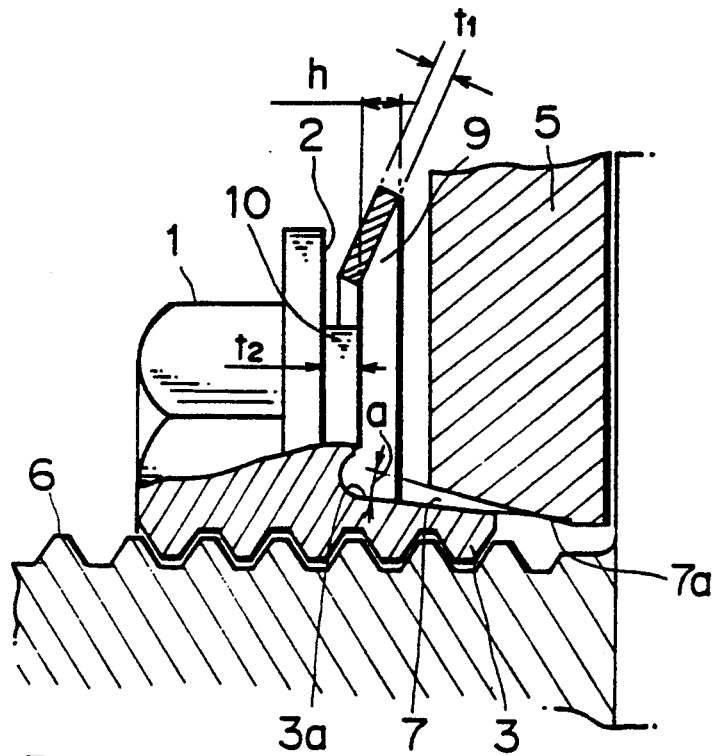
FIGS. 5a and 5b show a further embodiment which has a dish spring and a spacer installed between the nut and the member being tightened, with FIG. 5a representing a partial cross section of the fastening structure when it begins to be tightened and FIG. 5b representing a partial cross section when it is completely tightened.
Figure 5B:
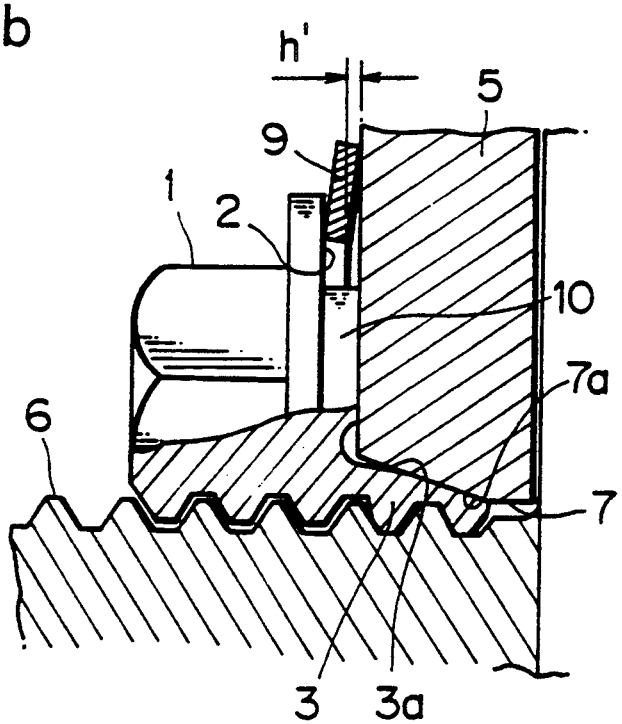

FIGS. 5a and 5b show a still another embodiment which indicates an example use of a dish spring when the washer 8 is not used. In this embodiment, the spacer 10 is formed integral with the nut 1. The working and the effects of the spacer are the same as the embodiment of FIG. 4.

As mentioned above, the nut has a cylindrical female screw extension portion projecting from the seat of the nut, the extension portion having a female screw formed in the inner circumferential surface thereof. The member to be tightened which is on the male screw side is formed with a fastening hole into which the female screw extension portion is to be fitted. The inner surface of the fastening hole and the outer surface of the female screw extension portion are tapered so that there is an angle difference between the two tapered surfaces. When the nut is fastened onto the male screw, the female screw extension portion deforms inwardly due to the taper angle difference and is pressed against the male screw to lock it. This invention provides a nut with a simple construction which is very unlikely to become loose.

With additional use of a dish spring and a spacer, it is possible to obtain a fastening structure made up of a nut and a member which is more reliably locked and has a reduced possibility of loosening.

What is claimed is:

1. A fastening structure, comprising:
   a nut and a to-be-tightened member;
   a cylindrical female screw extension portion which projects from a seat of the nut and which has a female screw thread formed in the inner circumferential surface thereof;
   a fastening hole formed in the to-be-tightened member into which the female screw extension portion is to be fitted;
   whereby the inner surface of the fastening hole and the outer surface of the female screw extension portion are tapered such that there is a taper angle difference between the two surfaces and such that when the nut is fastened onto the male screw, the female screw extension portion is deformed inwardly due to the taper angle difference and pressed against the male screw, preventing the loosening of the nut; and
   wherein between the nut and the to-be-tightened member is installed a dish spring which is deformed by fastening the nut and a spacer which is loosely fitted into the hole of the dish spring and is thicker than the thickness of the dish spring.

2. A fastening structure as claimed in claim 1, wherein the spacer is formed integral with the nut.

3. A fastening structure as claimed in claim 1, wherein the female screw extension portion is formed with at least one radially extending dividing groove.

4. A fastening structure comprising:
a nut and a to-be-tightened member;
a cylindrical female screw extension portion which projects from a seat of the nut and which has a female screw thread formed in the inner circumferential surface thereof;
a washer having a fastening hole formed therein and adjacent to the to-be-tightened member, the female screw extension portion to be fitted into the fastening hole;

whereby the inner surface of the washer and the outer surface of the female screw extension portion are tapered such that there is a taper angle difference between the two surfaces and such that when the nut is fastened onto the male screw, the female screw extension portion is deformed inwardly due to the taper angle difference and pressed against the male screw, preventing the loosening of the nut; and wherein between the nut and the to-be-tightened member is installed a dish spring which is deformed by fastening the nut and a spacer which is loosely fitted into the hole of the dish spring and is thicker than the thickness of the dish spring.

5. A fastening structure as claimed in claim 4, wherein the dish spring is installed between the washer and the to-be-tightened member, and the spacer is formed integral with the washer.

* * * * *